United States Patent [19]
Hilbert et al.

[11] Patent Number: 5,480,364
[45] Date of Patent: Jan. 2, 1996

[54] ELEVATED IDLE SPEED CONTROL AND METHOD OF OPERATING SAME

[75] Inventors: Mark J. Hilbert; Prasad V. Parupalli; Mark E. Rettig, all of Peoria, Ill.

[73] Assignee: Caterpillar Inc., Peoria, Ill.

[21] Appl. No.: 290,263

[22] Filed: Aug. 15, 1994

[51] Int. Cl.⁶ .................................................. B60K 41/06
[52] U.S. Cl. .................. 477/107; 477/73; 477/111; 477/173
[58] Field of Search ........................... 477/73, 91, 110, 477/111, 173, 107

[56] References Cited

U.S. PATENT DOCUMENTS

| | | | |
|---|---|---|---|
| 4,819,777 | 4/1989 | Yasue et al. | 477/73 X |
| 4,892,014 | 1/1990 | Morell et al. | 477/92 |
| 5,115,694 | 5/1992 | Sasaki et al. | 477/98 |
| 5,162,997 | 11/1992 | Takahashi | 477/107 X |
| 5,337,239 | 8/1994 | Okuda | 477/110 X |

*Primary Examiner*—Charles A. Marmor
*Assistant Examiner*—Peter Kwon
*Attorney, Agent, or Firm*—R. Carl Wilbur

[57] ABSTRACT

An elevated idle speed control is disclosed for use with an internal combustion engine on a vehicle. The control includes an electronic controller connected to a brake pedal sensor, a clutch pedal sensor, an engine speed determining means, a vehicle speed determining means, and a high idle mode selection means. The control permits a vehicle operator to select a desired high idle speed within a default high idle speed and a maximum high idle speed. The control permits the operator to select a high idle mode as a function of signals from said brake pedal sensor, said clutch pedal sensor, the engine speed determining means, the vehicle speed determining means and the high idle mode selection means.

14 Claims, 3 Drawing Sheets

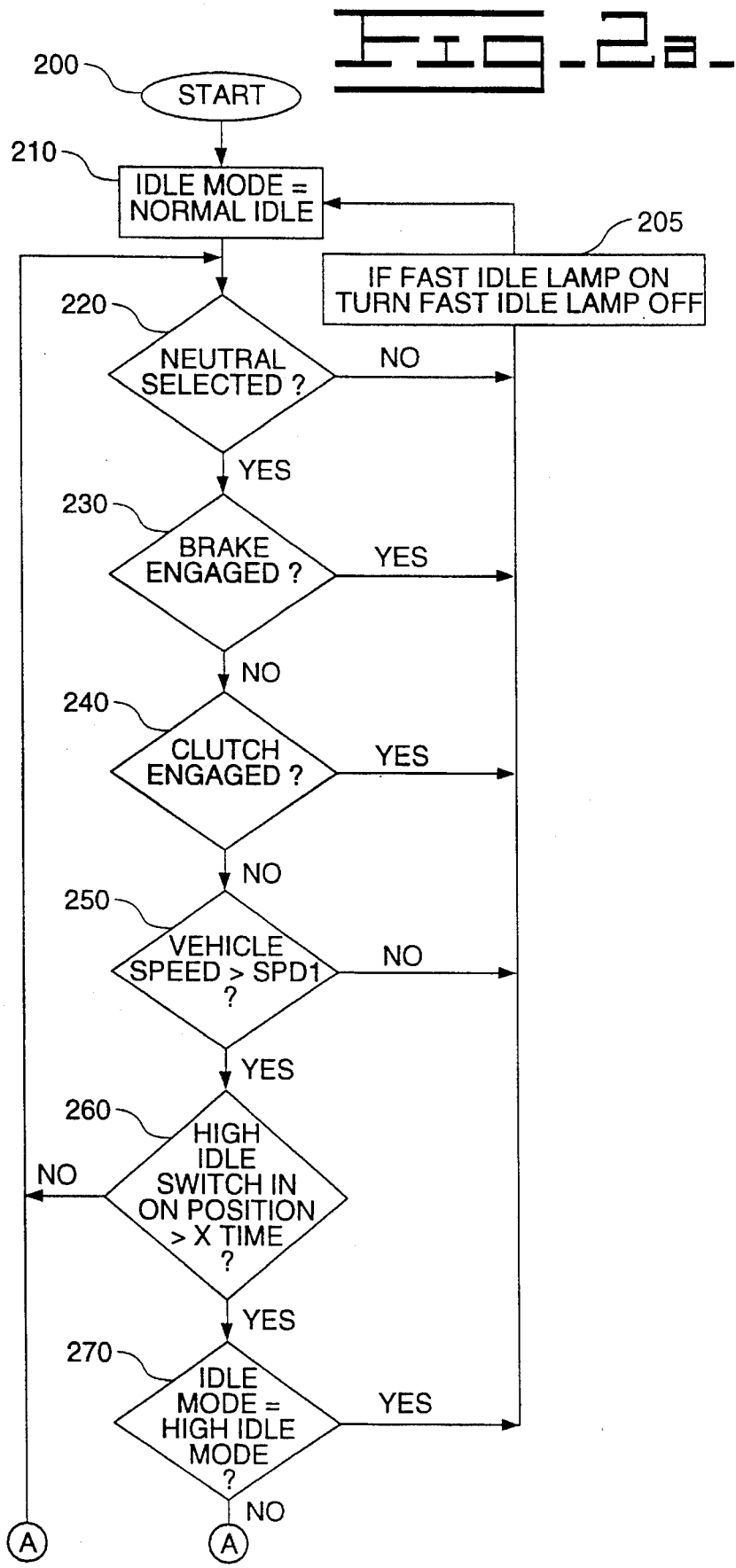
Fig_2a

ELEVATED IDLE SPEED CONTROL AND METHOD OF OPERATING SAME

TECHNICAL FIELD OF THE INVENTION

The present invention generally relates to electronic engine controls, and more specifically, relates to an elevated idle speed control that permits the engine operator to select an elevated engine idling speed.

BACKGROUND OF THE INVENTION

On highway trucks often have a power-take-off ("PTO") or other device which allows the truck engine to power devices connected to the truck. The PTO generally includes a rotating shaft extending rearwardly from the cab. The device to be powered is then connected to the PTO shaft. As the PTO shaft rotates, power is transmitted to the device. One such device is a refrigerated trailer. In some refrigerated trailers the PTO is used to power the compressor to keep the trailer at the desired refrigerated temperature. Other vehicles that have a PTO include utility vehicles, school buses and firetrucks.

Thus, the truck engine provides power to both the PTO and the drive train of the truck. In cases where the truck is travelling on the road, the engine speed is generally high enough to provide sufficient power for both the PTO and the transmission. However, when the truck is parked and idling, the engine may not produce sufficient power to drive the external device connected to the PTO. In this instance, the operator is required to press the accelerator pedal to elevate the idle speed to cause the engine to produce more power. However, manually maintaining a desired elevated idle speed is inefficient and prevents the operator from sleeping or performing other tasks when the truck is stopped and idling.

It would be preferable to use a truck engine having an automatic means for selectively commanding an elevated idle level at desired times.

SUMMARY OF THE INVENTION

In one aspect of the present invention, an apparatus for selectively commanding an elevated high idle mode is disclosed. The apparatus preferably includes a toggle switch or other means for causing the engine to enter a high idle mode. High idle mode will normally be selectable when the brake pedal is not pressed, the clutch pedal is not pressed, the vehicle is travelling below a certain predetermined speed, and the gear selector is in neutral. In a preferred embodiment, if the engine speed is below a default valve when the toggle switch is activated, then the idle speed will correspond to the default valve. If the engine speed exceeds a maximum high idle value when the toggle switch is activated, then the idle speed will correspond to the maximum high idle value. If the engine speed is greater than the default value but less than the maximum high idle value when the toggle switch is activated, then the idle speed will correspond to the engine speed.

Other aspects and advantages of the present invention will become apparent upon reading the detailed description in connection with the drawings and appended claims.

DETAILED DESCRIPTION OF A PREFERRED EMBODIMENT

A preferred embodiment of the best mode of practicing the present invention is described herein. However, the present invention is not limited to this single embodiment. On the contrary, the present invention encompasses all alternative designs and equivalents that fall within the scope of the present invention as defined by the appended claims.

Figure 1:
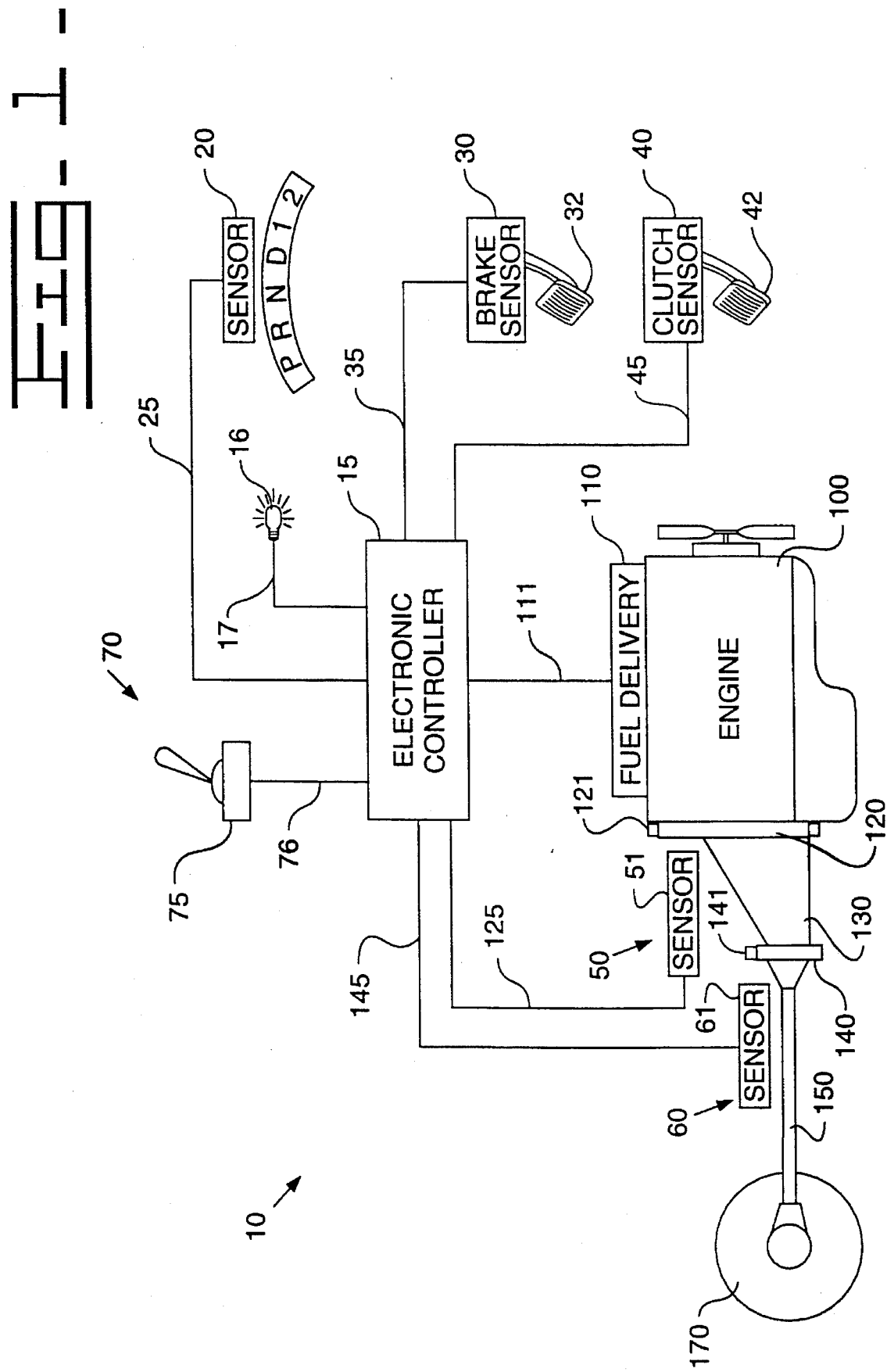
FIG. 1 is a block diagram of a preferred embodiment of the elevated idle control of the present invention.

Referring first to FIG. 1, a preferred embodiment of the elevated idle speed control 10 is shown. The elevated idle speed control 10 is used in connection with an internal combustion engine 100 having fuel delivery means 110 associated therewith. Associated with the engine 100 is a flywheel 120 rotatably connected to a transmission 130 to transmit power from the engine 100 to a drivewheel 170 of the vehicle. The transmission is also connected to a second flywheel 140. The second flywheel 140 transmits power to a rotatable driveshaft 150 which, in connection with other gearing (not shown) causes the drive wheels 170 of the vehicle to turn, thereby propelling the vehicle.

The elevated idle speed control 10 includes an electronic controller 15, which is electrically connected to a gear selector sensor 20 via electrical connector 25, to a brake pedal sensor 30 via electrical connector 35, and to a clutch pedal sensor 40 via electrical connector 45. A high idle mode indicator lamp 16 is also connected to the electronic controller 15 via an electrical connector 17.

The gear selector sensor 20 is associated with a gear shift or gear selector lever (not shown) and produces a neutral signal when the gear selector lever is in a neutral position and the transmission is therefore in neutral. The electronic controller 15 inputs the neutral signal from electrical connector 25. In some applications of the present invention, a gear selector sensor might not be utilized. Such an embodiment might arise where the vehicle has a manual transmission. Although a preferred embodiment has been described having a gear selector sensor 20, other embodiments without such a sensor also fall within the scope of the present invention as defined by the appended claims.

The brake pedal sensor 30 is associated with the brake pedal 32 and produces a brake pedal engaged signal when the truck operator has depressed the brake pedal 32. The electronic controller 15 inputs the brake pedal engaged signal from electrical connector 35.

The clutch pedal sensor 40 is associated with the clutch pedal 42 and produces a clutch pedal engaged signal when the truck operator has depressed the clutch pedal 42. In a preferred embodiment, the electronic controller 15 inputs the clutch pedal engaged signal from electrical connector 45. However, it should be recognized that other embodiments, particularly those applications involving automatic transmissions where a clutch pedal is not used, may not have a clutch pedal sensor 40. Those embodiments will nevertheless fall within the scope of the present invention as defined by the appended claims.

Also connected to the electronic controller are means for determining engine speed 50, means for determining vehicle speed 60 and high idle mode selection means 70. In a preferred embodiment, the engine speed determining means 50 includes a flywheel 120 associated with the engine 100. The flywheel 120 preferably includes teeth 121 or other features that are capable of being sensed as the flywheel 120 rotates. An engine speed sensor 51 is preferably installed in proximity to the flywheel 120 to permit the sensor 51 to sense the flywheel teeth 121 as the flywheel 120 rotates. The engine speed sensor 51 produces a signal that is a function of the rotational velocity of the flywheel 120, which in turn is a function of the engine speed. The electronic controller 15 inputs the engine speed signal from an electrical connector 125.

The means for determining the vehicle speed 60 preferably includes a second flywheel 140 that rotates at a speed that is a function of the speed of the rotating driveshaft 150. The second flywheel 140 preferably includes teeth 141 or other features such as slots that are capable of being sensed when the second flywheel 140 rotates. A vehicle speed sensor 61 is located proximate to the second flywheel 140 such that the vehicle speed sensor can sense the passing of the teeth 141 or other features as the flywheel 140 rotates. The vehicle speed sensor 140 produces a vehicle speed signal that is a function of the rotational velocity of the second flywheel 140, which in turn is a function of the speed of the drive shaft and the vehicle. The electronic controller 15 inputs the vehicle speed signal over an electrical connector 145.

The high idle mode selection means 70 preferably includes a two position toggle switch 75 that is biased to a first position. An operator can toggle the switch 75 to a second position, but when the operator releases the toggle switch 75 it returns to the first position. The toggle switch 75 produces a toggle switch signal when said switch is in the second position. The electronic controller 15 inputs the toggle switch signal over an electrical connector 76. Although a preferred embodiment is described as including a toggle switch 75, other suitable switches can be readily and easily used without deviating from the spirit and scope of the present invention as defined by the appended claims. For example, one skilled in the art would recognize that a pressure switch, or other suitable momentary switch could be substituted for the toggle switch.

As is known in the art, the electronic controller 15 produces a fuel command that is delivered to the fuel delivery means 110. The fuel command determines the quantity of fuel that will be delivered to the individual engine cylinders and therefore, in part, determines the rotational velocity of the engine. In a preferred embodiment, the fuel delivery means includes a plurality of electronically controlled fuel injectors (not shown). However, the present invention is not limited to engines having fuel injectors and includes other fuel delivery systems. In a preferred embodiment of the present invention, the electronic controller 15 issues a fuel delivery command over an electrical connector 111.

Figure 2B:
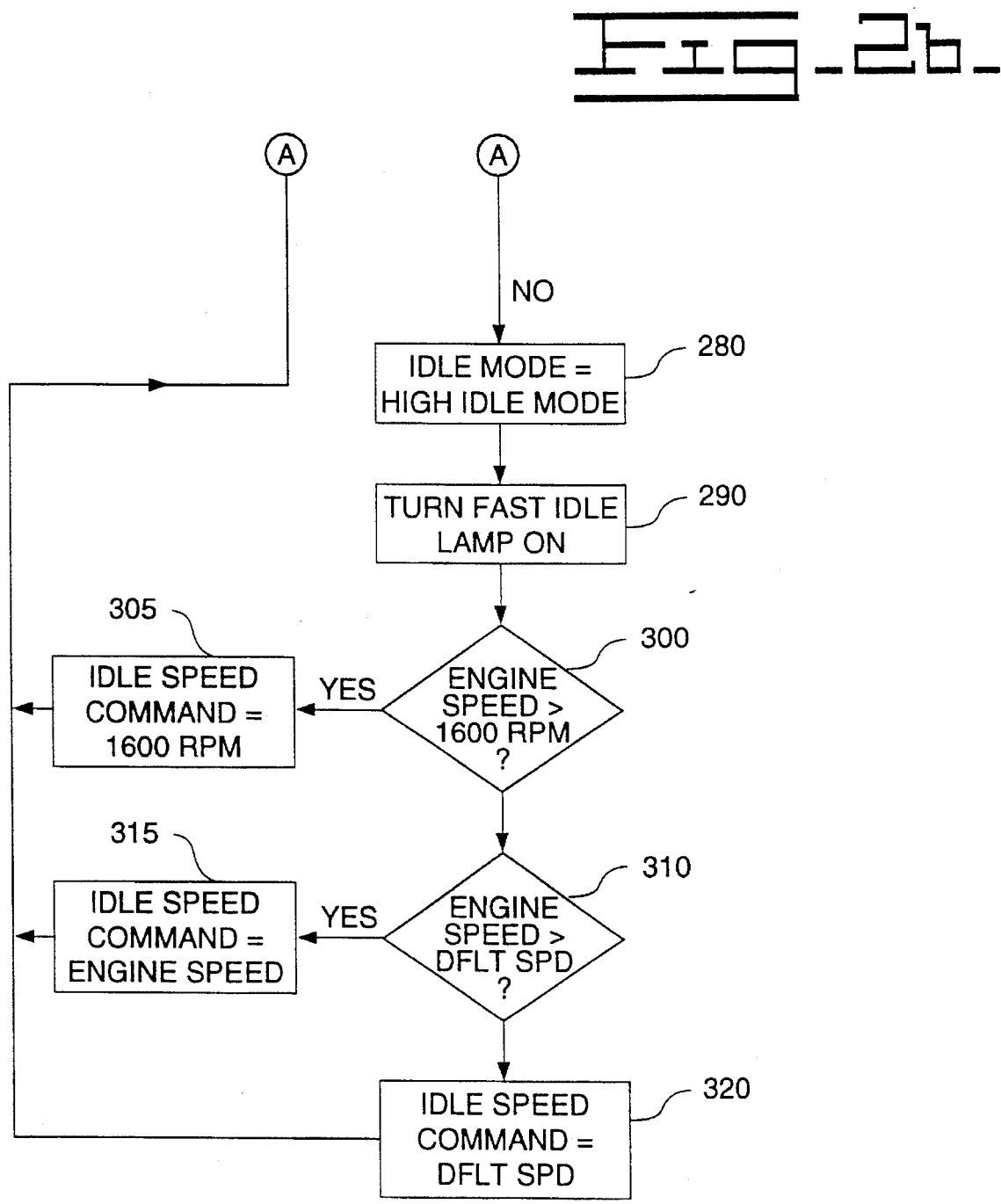
FIG. 2 is a flow chart of a preferred embodiment of the software control implemented in an electronic controller of the present invention.

Referring now to FIG. 2, a flowchart of the software control implemented in a preferred embodiment of the present invention is disclosed. The software necessary to perform the functions detailed in the flowchart can be readily and easily written by one skilled in the art using the instruction set for the specific microprocessor or electronic controller used in connection with the present invention. A preferred embodiment of the present invention uses a Motorola 68HC11, although other suitable microprocessors can be readily and easily substituted without deviating from the spirit and scope of the present invention as defined by the appended claims.

Block 200 starts the software control implemented in a preferred embodiment of the invention. Software control passes to block 210. In block 210, the electronic controller 15 sets the variable IDLE MODE equal to NORMAL IDLE MODE. The electronic controller 15 uses the IDLE MODE variable to assign the current operating mode. If the controller is currently operating in HIGH IDLE MODE, then the IDLE MODE variable is set to HIGH IDLE MODE. On the other hand, if the electronic controller 15 is operating in NORMAL IDLE MODE, then the IDLE MODE VARIABLE is set to NORMAL IDLE MODE. In block 210, the electronic controller initializes the IDLE MODE variable to NORMAL IDLE MODE. Software control then passes to block 220.

In block 220, the electronic controller 15 determines whether the gear selector sensor 20 is producing a neutral signal on the electrical connector 25, which indicates that the gear selector, and thus the transmission 130, is in neutral. If the gear selector sensor is producing a neutral signal then software control passes to block 230. Otherwise, control passes to block 205.

In block 230, the electronic controller 15 determines whether the brake sensor 30 is producing a brake engaged signal on the electrical connector 35. If so, then software control passes to block 240. Otherwise, software control passes to block 205.

In block 240, the electronic controller 15 determines whether the clutch sensor 40 is producing a clutch engaged signal on electrical connector 45. If the clutch sensor 40 is producing a clutch engaged signal, then software control passes to block 205. Otherwise, software control passes to block 250.

In block 250, the electronic controller 15 inputs the vehicle speed signal produced by the vehicle speed sensor 61 on electrical connector 145. If the vehicle speed signal corresponds to a vehicle speed less than a first predetermined vehicle speed (SPD1) then software control passes to block 260. Otherwise software control passes to block 205. The first predetermined vehicle speed SPD1 value is selected so that the electronic controller can determine that the vehicle is stopped, or only moving very slowly despite that the transmission 130 is in neutral. In a preferred embodiment, SPD1 is selected as approximately seven miles-per-hour. However, it should be recognized that other similar values could be readily and easily substituted for this value without deviating from the spirit and scope of the present invention as defined by the appended claims.

In a preferred embodiment of the invention, the combination of software blocks 220–250 represent a set of conditions that generally must exist before the operator can cause the engine controller 15 to enter HIGH IDLE MODE. Those conditions include: the transmission being in neutral, the brakes not being engaged, the clutch not being engaged, and the vehicle speed being below seven miles-per-hour. As described below, when the operator then selects HIGH IDLE MODE through use of the high idle mode selection means 70, the engine controller 15 will issue a fuel delivery command corresponding to one of a maximum high idle speed, a desired high idle speed or a default high idle speed.

If the conditions of blocks 220–250 are satisfied, then the software control passes to block 260. In block 260, the electronic controller 15 monitors the electrical connector 76 to determine whether a signal from the toggle switch 75 is present for more than a predetermined period of time (x time). The toggle switch 75 produces the signal when the operator moves the toggle switch 75 to the second position.

If the electronic controller 15 determines that the toggle switch 75 has been in the second position for more than the predetermined period of time (x time), then control passes to block 270. Otherwise, control returns to block 220.

In block 270, the electronic controller reads the variable IDLE MODE and determines whether the IDLE MODE variable is set to HIGH IDLE MODE. If the current IDLE MODE VARIABLE equals HIGH IDLE MODE then software control passes to block 205. In this manner, when the engine is operating in HIGH IDLE MODE, the operator can return to NORMAL IDLE MODE by moving the toggle switch 75 to the second position for more than the predetermined period of time. In block 205 the electronic controller 15 causes the fast idle lamp 16 on the operator display panel to be extinguished. This provides a visual indication to the operator that the electronic controller has returned to a NORMAL IDLE MODE. Software control then passes to block 210 where the electronic controller 15 sets the IDLE MODE variable to NORMAL IDLE MODE and software control passes to block 220.

If, on the other hand, in block 270 the IDLE MODE does not equal HIGH IDLE MODE, then software control passes to block 280. The IDLE MODE VARIABLE will be NORMAL IDLE MODE in block 270 when the engine was operating in NORMAL IDLE MODE and the operator moved the toggle switch 75 to the second position for more than the predetermined period of time. This indicates to the electronic controller 15 that the operator desires to be in HIGH IDLE MODE. In block 280, the electronic controller 15 sets the IDLE MODE to HIGH IDLE MODE. Control then passes to block 290.

In block 290 the electronic controller 15 causes the fast idle lamp 16 on the operator dash board to light, thereby indicating that the electronic controller 15 is operating in HIGH IDLE MODE. Software control then passes to block 300.

In blocks 300–320, the electronic controller 15 stores a value in an IDLE SPEED COMMAND variable. The electronic controller 15 uses the value stored in the IDLE SPEED COMMAND variable to calculate the fuel delivery command issued to the fuel delivery mean 110 when the engine is idling and the IDLE MODE variable is in HIGH IDLE MODE.

In block 300, the electronic controller 15 monitors the engine speed signal produced on electrical connector 125 by the engine speed determining means 50. If the engine speed signal on electrical connector 125 corresponds to an engine speed greater than a maximum high idle value (MAX HIGH IDLE), then software control passes to block 305. In a preferred embodiment, the maximum high idle value (MAX HIGH IDLE) is about 1600 RPM. However, other engine speeds could be readily and easily substituted without deviating from the spirit and scope of the present invention as defined by the appended claims. In block 305, a preferred embodiment of the present invention causes the electronic controller 15 to set the IDLE SPEED COMMAND equal to an idle speed corresponding to the maximum high idle value. Thus, in a preferred embodiment, the combination of blocks 300 and 305 causes the maximum high idle speed to be set to 1600 RPM.

In block 300, if the engine speed signal on electrical connector 125 corresponds to an engine speed less than the maximum high idle value (MAX HIGH IDLE), then software control passes to block 310. In block 310, the electronic controller 15 determines whether the engine speed signal on connector 125 corresponds to an engine speed signal greater than a predetermined DEFAULT HIGH IDLE SPEED (DFLT SPD). In a preferred embodiment, the DEFAULT HIGH IDLE SPEED (DFLT SPD) is approximately 1200 RPM. However, it should be recognized that other default speeds could be readily and easily selected without deviating from the spirit and scope of the present invention as defined by the appended claims. If the engine speed signal is greater than the DEFAULT HIGH IDLE SPEED (DFLT SPD), then software control passes to block 315. Otherwise control passes to block 320.

In block 315, the electronic controller 15 sets the IDLE SPEED COMMAND equal to the engine speed corresponding to the engine speed signal on electrical connector 125. Thus, if the engine speed signal corresponds to an engine speed between the DEFAULT HIGH IDLE SPEED (DFLT SPD) and MAXIMUM HIGH IDLE SPEED (MAX HIGH IDLE), then the IDLE SPEED COMMAND will be set to the engine speed. In this manner, the operator can press an engine accelerator pedal to increase the engine speed and when the engine speed reaches a desired HIGH IDLE SPEED the operator toggles the toggle switch 75 to the second position for greater than the predetermined length of time (x time). The electronic controller 15 then programs the IDLE SPEED COMMAND to equal the engine speed corresponding to the engine speed signal on electrical connector 125. Thus, a preferred embodiment of the present invention permits the operator to select a desired high idle speed within the limits established by the DEFAULT HIGH IDLE SPEED and the MAXIMUM HIGH IDLE SPEED.

In block 320, the IDLE SPEED COMMAND is set to a DEFAULT HIGH IDLE SPEED (DFLT SPD). As mentioned above, in a preferred embodiment, the DFLT SPD is approximately 1200 RPM. Thus, if the operator toggles the switch 75 for greater than the predetermined period of time (x time) and the engine speed is less than the DEFAULT HIGH IDLE SPEED (DFLT SPD), then the IDLE SPEED COMMAND is set to the DEFAULT HIGH IDLE SPEED. From blocks 305, 315 and 320, program control returns to block 220.

By using a preferred embodiment of the software control described above, the operator can selectively choose the high idle mode when the conditions of blocks 210–250 are satisfied and the operator toggles the toggle switch 75 to the second position for more than the predetermined period of time (x time). The operator can select a desired idle speed, less than a maximum high idle speed, by pressing an accelerator pedal while the switch 75 is toggled. Otherwise, the high idle speed will correspond to a default speed. In this manner, an embodiment of the present invention permits the operator to cause the engine to idle at a higher than normal speed. This allows the engine to maintain power output levels necessary to drive devices connected to the engine PTO when the engine is idling.

What is claimed is:

1. An apparatus for controlling idling in an internal combustion vehicle engine connected to a transmission, said transmission connected to a drive wheel for propelling a vehicle, comprising in combination:

an electronic controller;

a brake sensor electrically connected to said electronic controller;

vehicle speed sensing means electrically connected to said electronic controller and adapted to produce a vehicle speed signal;

engine speed sensing means electrically connected to said electronic engine controller and adapted to produce an engine speed signal;

high idle mode selection means electrically connected to said electronic controller;

wherein said electronic controller produces an idle speed command corresponding to an elevated idle speed as a function of signals from said brake sensor, said vehicle speed sensing means, said engine speed sensing means, and said high idle mode selection means.

2. The apparatus according to claim 1, including:

a clutch sensor electrically connected to said electronic controller; and wherein said electronic controller produces said idle speed command corresponding to an elevated idle speed as a function of signals from said brake sensor, said clutch sensor, said vehicle speed sensing means, said engine speed sensing means, and said high idle mode selection means.

3. The apparatus according to claim 2, including:

a gear selector sensor electrically connected to said electronic controller; and wherein said electronic controller produces said idle speed command corresponding to an elevated idle speed as a function of signals from said brake sensor, said clutch sensor, said gear selector sensor, said vehicle speed sensing means, said engine speed sensing means, and said high idle mode selection means.

4. The apparatus according to claim 3, wherein said engine speed sensing means includes:

a first flywheel connected to said engine, said first flywheel having a tooth;

a passive engine speed sensor located proximate to said first flywheel and adapted to produce a signal corresponding to the rotational velocity of said flywheel.

5. The apparatus according to claim 3, wherein said vehicle speed sensing means includes:

a second flywheel connected to said transmission and turning at a speed that is a function of the rotational speed of the transmission, said second flywheel having a tooth;

a passive speed sensor located proximate to said second flywheel, and adapted to sense the passing of said tooth and produce a signal corresponding to the passing of said tooth.

6. The apparatus according to claim 3, wherein said high idle mode selection means includes a switch having a first and second position, said switch being biased to said first position, wherein said electronic controller produces said idle speed command corresponding to an elevated idle speed in response to said switch being in said second position for more than a predetermined length of time.

7. The apparatus according to claim 4, wherein:

said vehicle speed sensing means includes a second flywheel connected to said transmission and turning at a speed that is a function of the rotational speed of the transmission, said second flywheel having a tooth;

said vehicle speed sensing means includes a passive speed sensor located proximate to said second flywheel, and adapted to sense the passing of said tooth and produce a signal corresponding to the passing of said tooth; and wherein said high idle mode selection means includes a switch having a first and second position, said switch being biased to said first position, wherein said electronic controller produces said idle speed command corresponding to an elevated idle speed in response to said switch being in said second position for more than a predetermined length of time.

8. An apparatus according to claim 3, wherein said electronic controller produces an idle speed command corresponding to a default idle speed as a function of said brake sensor producing a signal corresponding to said brake pedal not being depressed, said gear selector sensor producing a signal corresponding to a selected gear of neutral, said clutch sensor producing a signal corresponding to said clutch not being engaged, said vehicle speed sensing means producing a signal corresponding to a vehicle speed of less that a predetermined vehicle speed, said high idle mode means being activated for greater than a predetermined length of time, and said engine speed sensing means producing an engine speed signal corresponding to an engine speed less than said default idle speed.

9. An apparatus according to claim 3, wherein said electronic controller produces an idle speed command corresponding to a maximum high idle value as a function of said brake sensor producing a signal corresponding to said brake pedal not being depressed, said gear selector sensor producing a signal corresponding to a selected gear of neutral, said clutch sensor producing a signal corresponding to said clutch not being engaged, said vehicle speed sensing means producing a signal corresponding to a vehicle speed of less than a predetermined vehicle speed, said high idle mode means being activated for greater than a predetermined length of time, and said engine speed sensing means producing an engine speed signal corresponding to an engine speed greater than said maximum high idle value.

10. An apparatus according to claim 3, wherein said electronic controller produces an idle speed command corresponding to an engine speed signal produced by said engine speed sensing means as a function of said brake sensor producing a signal corresponding to said brake pedal not being depressed, said gear selector sensor producing a signal corresponding to a selected gear of neutral, said clutch sensor producing a signal corresponding to said clutch not being engaged, said vehicle speed sensing means producing a signal corresponding to a vehicle speed of less than a predetermined vehicle speed, said high idle mode means being activated for greater than a predetermined length of time, and said engine speed sensing means producing an engine speed signal corresponding to an engine speed less than a maximum high idle value and greater than a default idle speed value.

11. A method of operating an electronically controlled vehicle engine, including the steps of:

reading a signal produced by an engine speed sensor;

reading a signal produced by a vehicle speed sensor;

reading a signal produced by a brake pedal sensor;

reading a signal produced by a clutch pedal sensor;

reading a signal produced by a high idle mode selector;

producing an idle speed command as a function of said brake pedal signal, said clutch pedal signal, said high idle mode selector signal, said engine speed sensor signal and said vehicle speed sensor signal;

idling said engine at a speed corresponding to said idle speed command.

12. The method according to claim 11, wherein said step of producing includes the steps of:

setting said idle speed command to a default idle speed value as a function of reading an engine speed signal below said default engine idle speed value and reading a high idle mode selector signal.

13. The method according to claim 11, wherein said step of producing includes the steps of:

setting said idle speed command to value corresponding to a signal from an engine speed sensor as a function of reading an engine speed sensor signal below a maximum idle speed value and below a default idle speed value and as a function of reading a high idle mode selector signal.

14. The method according to claim 11, wherein said step of producing includes the steps of:

setting said idle speed command to a value corresponding to maximum idle speed value as a function of reading an engine speed sensor signal above said maximum idle speed value and reading a high idle mode selector signal.

* * * * *